United States Patent
Burkhardt et al.

(10) Patent No.: US 6,296,282 B1
(45) Date of Patent: Oct. 2, 2001

(54) ARTICULATED CONNECTING ELEMENT FOR PIPING ELEMENTS

(75) Inventors: Carlo Burkhardt, Grunbach; Fabian Elsässer, Straubenhardt, both of (DE)

(73) Assignee: Witzenmann GmbH Metallschlauch-Fabrik Pforzheim, Pforzheim (DE)

( * ) Notice: Subject to any disclaimer, the term of this patent is extended or adjusted under 35 U.S.C. 154(b) by 0 days.

(21) Appl. No.: 09/025,646

(22) Filed: Feb. 18, 1998

(30) Foreign Application Priority Data

Feb. 18, 1997 (DE) .............................. 197 06 191

(51) Int. Cl.⁷ .................................................. F16L 27/107
(52) U.S. Cl. ............................ 285/49; 285/226; 285/300; 285/227
(58) Field of Search ................................ 285/49, 226, 227, 285/300, 299

(56) References Cited

U.S. PATENT DOCUMENTS

| | | | | |
|---|---|---|---|---|
| 3,747,367 | * | 7/1973 | Muller | 285/226 |
| 3,985,378 | * | 10/1976 | Muller | 285/49 |
| 5,011,194 | * | 4/1991 | Nitta | 285/227 |
| 5,058,934 | * | 10/1991 | Brannon | 285/226 |
| 5,791,696 | * | 8/1998 | Miyajima et al. | 285/226 |

FOREIGN PATENT DOCUMENTS

| | | | |
|---|---|---|---|
| 33 21 382 | 2/1984 | (DE) . | |
| 37 19 840 | 12/1988 | (DE) . | |
| 40 09 215 | 10/1990 | (DE) . | |
| 39 15 838 | 11/1990 | (DE) . | |
| 4233644A1 | 4/1994 | (DE) . | |
| 295 09 434 | 9/1996 | (DE) . | |
| 19548340C1 | 12/1996 | (DE) . | |
| 195 48 123 | 7/1997 | (DE) . | |
| 0 391 026 | 10/1990 | (EP) . | |
| 0 519 636 | 12/1991 | (EP) . | |
| 0657683A2 | 6/1995 | (EP) . | |
| 0750100A1 | 12/1996 | (EP) . | |
| 0791731A1 | 8/1997 | (EP) . | |
| 2418333 | 9/1979 | (FR) . | |
| 2701752 | * 8/1994 | (FR) | 285/49 |
| 2 715 708 | 8/1995 | (FR) . | |
| 1260143 | * 1/1972 | (GB) | 285/49 |
| 03105012 | 5/1991 | (JP) . | |
| 40-6221481 | * 8/1994 | (JP) | 285/227 |

* cited by examiner

Primary Examiner—Eric K. Nicholson
(74) Attorney, Agent, or Firm—Venable; Gabor J. Kelemen (57) ABSTRACT

A gas tight articulated connecting element for piping elements includes: a flexible gas tight tube element to be securely connected with the piping elements; a supporting element disposed at a distance from the tube element at an exterior region thereof and including a plurality of supporting parts, each of the supporting parts being configured to be connected at one end thereof to a piping element adjacent thereto, and at another end thereof to an adjacent other end of an adjacent one of the supporting parts; and a flexible connection device disposed between adjacent ones of the supporting parts for connecting said another end to said an adjacent other end, the flexible connection device including an intermediate part made of an elastomer and being connected with the supporting parts in a locking connection.

12 Claims, 4 Drawing Sheets

ARTICULATED CONNECTING ELEMENT FOR PIPING ELEMENTS

CROSS REFERENCE TO RELATED APPLICATION

This application claims the priority of Application No. 197 06 191.5 filed Feb. 18, 1997, which is incorporated herein by reference.

FIELD OF THE INVENTION

This invention was made for the purpose of constructing a gas-tight articulated connecting element for piping elements, especially piping elements of the exhaust systems of combustion engines in vehicles. The connecting element includes at least one flexible tube element which is at least indirectly connected with the piping elements, and at least one supporting element arranged outside the tube element and in a distance to the same. The supporting element includes at least two supporting parts, each of them being at least indirectly connected with its adjacent piping element and with flexible connections between their ends facing each other.

BACKGROUND OF THE INVENTION

Such articulated connecting parts are installed between two piping elements of a pipe assembly which are generally in alignment with each other, for the purpose of allowing angular and also axial movements of one element with respect to another, and to obtain a counter decoupling regarding the transfer of vibrations and sounds between the piping elements. This invention is especially appropriate for application in the exhaust systems of vehicles, and the following text will in general refer to this application without restricting the field of application of the subject of this invention. Usually, the piping elements to be connected with each other, or their ends, are pipes with smooth surfaces. Connecting flanges, however, are appropriate for this application as well. The piping elements have, in general, circular cross-sectional areas which are coaxial towards the corresponding piping element, the piping element having a circular cross-sectional area as well. Cross-sectional areas of other shapes, however, are also possible, e.g. an oval cross-sectional area of the piping elements, with a cross-sectional area of the corresponding tube element being adapted to the same.

The flexible tube element can, in this special case, be a single- or multi-ply corrugated pipe, a bellows, a tightly stripwound hose or a similar part, with the material being selected according to the existing requirements. In the exhaust systems of vehicles, these parts and also the other components of the connecting element will be made of metal, unless an express note is made on the following pages that another type of metal is required. Annularly corrugated metal hoses are an especially preferable solution with respect to the tube element.

In the case of the connecting element previously mentioned, the ends of the supporting parts facing each other are equipped with metal wire cushions inserted in the radial connecting attachments formed by the supporting parts, with the connecting attachments being pressed against the metal wire cushions and thus against each other by brackets mounted from outside. This connection type provides a relatively rigid coupling of the supporting parts which results in a relatively low decoupling of vibrations and sounds. Furthermore, the degree of mobility of such a connecting element is quite low, and there is the danger that the mounted brackets will slip off, thus causing the breaking of the connection of the supporting parts with each other. Finally, the degree of mobility of the traditional version can only be adjusted to a limited extent.

SUMMARY OF THE INVENTION

One object of the instant invention is to provide a connecting element complying with the requirements mentioned in the beginning and allowing a high decoupling effect regarding the transfer of vibrations and sound. Additionally, a high degree of mobility of the connecting element facilitates the choice from a wide range of versions. Another object of the invention is the development of a design of low response to exterior influences and of high reliability in service.

The above object, along with others to become apparent as the description progresses, is attained according to the invention by the provision of a gas-tight tube element tightly connected with the piping elements. In this design, the flexible connection of the supporting parts includes at least one intermediate element made of an elastomer, the intermediate element being connected with the supporting parts in a non-positive or positive locking union.

As a consequence of the arrangement according to the invention, the supporting parts are connected by an element of high flexibility and a considerable interior damping rate. The connection between the supporting parts is thus highly movable and can also be easily adapted to the individual requirements of the arrangement by varying the Shore hardness of the elastomer.

Furthermore, the installation process of the intermediate element according to the invention allows high operating safety as the constructional details described in the following text will show.

The intermediate element according to the invention is also resistant to the high temperatures occurring particularly in the exhaust system of vehicles. The above is true without restrictions to Diesel engines because of their generally lower exhaust gas temperatures, but also to petrol engines because modern engines with their optimized consumption will emit less heat. Additionally, elastomers whose temperature resistance has also been optimized in the meantime, have a high resistance to constantly high temperatures. In this very context it is to be pointed out that the optimized temperature resistance of silicone rubber and fluoric silicone rubber has made them materials which are particularly appropriate for the intermediate element of this invention.

In a second embodiment which has been developed by modifying the initially mentioned articulated connection, the principles of the invention provide a flexible connection of the supporting parts including at least one intermediate element made of an elastomer, a non-positive and/or positive locking connection between the intermediate element and the supporting parts and a mostly gas-tight design of the assembly including supporting parts and an intermediate element, as well as an at least indirect tight connection between this assembly and the adjacent piping elements. This second embodiment makes use of the possibility, based on a combination with the first embodiment, of assigning to the assembly, the intermediate element and supporting parts, the function of gas-tight conveyance. This version does not require gas-tight tube elements, thus allowing a cheaper construction, especially a stripwound hose with an interlocked profile including a metal strip without sealing means.

In any other respect, the principles on which the first embodiment is based will also apply to the second embodiment.

It makes sense to use, in general, bell-shaped piping elements as supporting parts. These elements, with their conical necks, are at least indirectly connected with the corresponding piping element. According to the individual design, one or several intermediate elements can be inserted between the ends of these piping elements facing each other, with the possibility of distributing several unobtrusive intermediate elements equally over the whole range of the tube element.

The invention, however, also allows the use of brackets with generally bellmouthed longitudinal sections which are axially parallel to the tube element. These brackets are connected with the corresponding piping elements by an end ring with cylindrical cavity attached to the brackets. With this design, each end ring can be connected with at least two brackets distributed equally over the whole range of the tube element, with the connection formed either by insertion of a single element or by welding the parts already mentioned together. Furthermore, the brackets may either be rigid or elastic, depending on the requirements with respect to the operating properties of the connecting elements provided in the invention.

In the version described in the foregoing paragraph, the ends of the supporting parts facing each other can also have a profiled configuration which allows a good and secure connection with the intermediate element. For this purpose, the ends of the supporting parts facing each other can have a flexure of radial orientation or of hook-shaped cross-sectional area forming a corresponding denticulation between the supporting parts and the intermediate element. The intermediate element may either be sprayed onto the corresponding ends of the supporting parts or the intermediate element may form a denticulation together with the corresponding ends of the supporting parts by means of fitting cavities.

It has already been mentioned that several intermediate elements can be distributed equally over the whole range of the tube element, which can be provided for the prototype pe based on this invention.

Another particularly favorable design which is appropriate for both embodiments provided by this invention is the use of a ring, generally with conical cavity, enclosing the ends of the supporting parts, as an intermediate element. Each section of such an intermediate element can be situated along the exterior surface of a supporting part in direct contact with it, and these sections can be equipped with tensioning elements which keep the sections in contact with the exterior surface of the supporting parts. Spring washers, closed washers, tightening straps and similar parts are appropriate for use as tensioning elements.

The annular design of the supporting element in the design described hereinbefore provides an axially symmetrical appearance of the connecting element. As a consequence, it shows only a slight radial extension in relation to the diameter of the piping element, thus reducing the requirements with respect to installation space.

If brackets are used as supporting parts according to the prototype based on this invention, the ends of one bracket couple facing each other, with the brackets facing each other in an axial direction, can be connected by a separate intermediate element which is placed on the ends of the supporting parts facing each other in an appropriate way, i.e., in the way described hereinbefore. The resulting design is wider in an axial cross-sectional direction of the tube element. The advantage of this design is the low diameter in the transverse direction which may be particularly desirable under certain installation conditions.

Under certain conditions, all intermediate elements described hereinbefore may require at least one cavity in their central section between the ends of the supporting parts which covers the whole circumference of the tube element. As a result of the cutting-off of metal required with this design, there will be a very high increase in the axial degree of mobility of the intermediate elements, with these elements being extended or compressed, according to the principle of a bellows, to an extent higher than that required for solid intermediate elements.

Another provision for all types of intermediate elements described hereinbefore can be their reinforcement by incorporating a tissue-type insert, including, e.g., a metal wire or synthetic fiber tissue. The resistance of the intermediate elements can thus be influenced, perhaps to create an increase in elasticity which will mean an improvement in their damping properties.

In order to achieve, in particular, an improvement in the vibration damping properties of the connecting parts according to this invention, the following measures, each of which involves equal amount of effort, can be taken:

Direct contact between the central section of the individual intermediate section and the tube element, at least via a potentially existing bulge, can be provided. Another possibility of a similar principle is the use of a damping cushion enclosing the tube element perhaps to a full extent, to establish direct contact between the tube element and the central section of the intermediate section, with this damping cushion being inserted into a groove of the corresponding supporting part to form a positive locking connection. The axial range of such damping cushions can be adapted to the individual requirements, with the possibility of using axially parallel strips, generally running in longitudinal direction along the tube element. This version also allows the damping cushion or the bulge of the central section to protrude into a radial groove in the tube element. Finally, coating of the tube element with a braiding or wire mesh hose can be provided (metal versions are particularly appropriate), with the ends of the braiding or wire mesh hose being attached to or firmly connected with the ends of the tube element.

A feature which all such versions have in common is the counter friction caused by axial movements of the components mentioned and by axial movements of the tube element. Such counter friction occurs between the tube element and the bulge or the damping cushion or the hose and will provide damping of the vibrations occurring in combination with the movements, and a reduction of the amplitude and frequency of the movements.

Another modification of the invention provides a design whose supporting parts and/or intermediate elements have at least one perforation in their free sections. The existence of a higher or lower number of, in most favorable cases, equally distributed perforations in the parts mentioned hereinbefore will allow a good ventilation of the space surrounding the tube element, thus providing a good emission of heat and preventing a localization of heat.

Generally, each of the embodiments of the invention can provide a radial insertion of the ends of the tube elements assigned to the corresponding piping elements into the supporting parts, and their attachment onto the piping element or their location close to the end of the piping element with which they are tightly connected, with this connection type being, as a rule, performed in a welding process. The connecting element based on this invention can therefore be part of a completed assembly which only requires final connection with the piping elements.

With this version, at least one end of the tube element can be equipped with at least one inserted end ring, adapting the tube element to the dimensions required by increasing in its wall thickness and also its stability.

With this version, at least one of the end rings can form part of an internal sleeve protruding by an essential part of its length into the tube element and lying at a radial distance to the tube element, which has the task of smoothing the flow within the tube element and protecting the tube element with respect to stress caused by temperatures and exhaust gases, according to generally well-known principles.

In order to increase this effect, a distance between the individual parts of an internal sleeve starting from two end rings which are radially inserted into each other can be provided.

Finally, and for the same reason, the end of at least one wire-braided hose or of at least one hose with an interlocked profile which is inserted into one end of the tube element can be provided. This hose runs along the substantial part of the length of the tube element and is further disposed at a radial distance to the tube element.

BRIEF DESCRIPTION OF THE DRAWINGS

The foregoing objects of the invention, together with other objects and advantages which may be attained by its use, will become more apparent upon reading the following detailed description of the invention taken in conjunction with the drawings. In the drawings, where like reference numerals identify corresponding components.

DETAILED DESCRIPTION OF THE INVENTION

In the following description of the embodiments presented in FIGS. 1 to 7, like parts are assigned like reference numerals. Detailed descriptions of these parts will only be given once.

Figure 1:
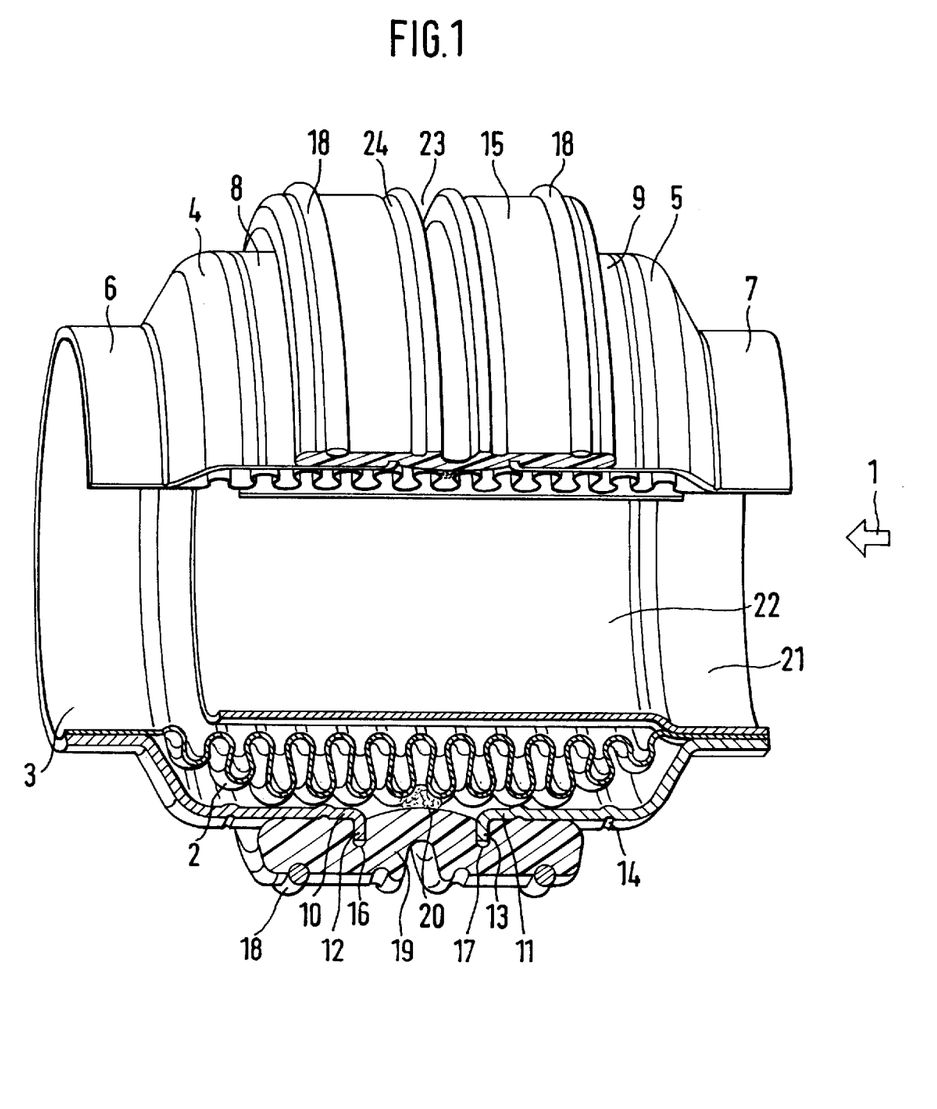
FIG. 1 is a partly sectional perspective view of a first embodiment of the connecting element based on the invention.

FIG. 1 shows that the connecting element through which the gas is conveyed in the direction of the arrow 1 is equipped with an annularly corrugated metal hose 2 with cylindrical connection ends 3. The diameter of the corrugations of this hose adjacent to the connection ends 3 increases in a generally well-known way only gradually up to the final external diameter of the metal hose 2.

The necks 6, 7 of the supporting parts 4, 5 which are bell-shaped are attached to the connection ends 3 of the metal hose 2 free of tolerances, the axially parallel sleeves 8, 9 of the supporting parts 4, 5 having a radial distance to the exterior outline of the metal hose 2, thus allowing a generally free degree of mobility of the metal hose 2 within the sleeves 8, 9 of the supporting parts 4, 5.

The ends 10, 11 of the supporting parts 4, 5, face each other and have at an axial distance with respect to one another, their ends being equipped with hooks or bends 12, 13 extending in a radially outward direction. The circular profile increases the mechanical stability of the sleeves 8, 9.

The ends of the supporting parts 4, 5 are connected by an intermediate part 15 including an elastomer, e.g. silicone rubber, which is in direct contact with the exterior surface of the sleeves 8, 9, with the bends 12, 13 protruding into the corresponding cavities 16, 17 to form a positive locking connection therewith. Since the intermediate part 15 almost totally fills the distance between the ends 10, 11 of the supporting parts 4, 5, the supporting parts are connected by the intermediate part in a damped, elastically buffered connection.

Spring washers 18 are attached to those sections of the intermediate part 15 which overlap the sleeves, in order to keep the intermediate part 15 from being lifted from the contact surface and thus from lost work due to deformation.

An annular damping cushion 20 is inserted between the central section 19 of the intermediate part 15 and the tube element 2, which is protected from axial displacement by a protrusion filling the gap between two subsequent corrugation crests of the tube element 2. The damping cushion 20 can get out of alignment with the central section 19. The friction occurring in this process will especially reduce the axial vibrations of the free central section of the tube element 2, thus providing a reduction of the amplitude and frequency in the vibrations.

It has become apparent that the element which is shown in FIG. 1 and used for the connection of two pipe ends (not shown in the Figure) which are combined with the connection ends 3, for example, by pushing the connection ends onto the pipes, is able to connect the pipe line ends tightly with each other, also allowing, at the same time, axial and lateral movements of the pipe line ends towards each other, thus decoupling vibration and sound transmission between the pipe line ends. This is, above all, due to the generally well-known principle of using an annularly corrugated hose as the tube element, but also to the fact that the connection ends 3 of the tube element and thus the ends of the continuing piping elements are both damped by the supporting element formed by the supporting parts 4, 5 and the intermediate part 15 made of an elastomer, and also form a connection having good flexibility and supporting properties.

In order to protect the tube element 2 especially from the temperatures of the conveyed gas, and in order to smooth the flow of the gas, an end ring 21 is inserted into the upstream connection end of the tube element. This end ring is the point of origin of a coaxial internal sleeve 22 which covers an essential part of the length of the tube element 2 and has at a radial distance to this element.

It has become evident that the central section 19 of the intermediate part 15 has a circular cavity 23 and also two further cavities 24 of smaller radial depth. The aim of these cavities is to reduce the stiffness of the central section mentioned hereinbefore with respect to axial movements, i.e. to make it more flexible, in combination with an increase in its degree of elastic mobility. In the instant application, flexible or elastic connotes flexibility or elasticity relative to materials customarily used in manufacturing piping element. In addition to the adjustment of the elastic properties of the intermediate part by means of the selection of its material, an individual adjustment of the elastic properties of the intermediate part 15 can also be carried out by means of the appropriate design of the cavities 23, 24.

In a version not included in the graphic presentation, the intermediate part 15 is reinforced by a metal wire or synthetic fiber insert to increase its resistance. This applies also to the intermediate parts described in the following text. The existence of such an insert is therefore not mentioned in these passages of the text.

The connecting element described with reference to FIG. 1 is equipped with a metal hose 2 used as the interior tube element. In the instant invention, e.g., the metal hose may be a gas-tight corrugated hose. The second embodiment based on this invention is equipped with a stripwound hose instead of the corrugated hose. The stripwound hose with an interlocked profile but without seal is not gas-tight. For this reason, the assembly including the supporting parts 4, 5 and the intermediate part 15 are to be intrinsically gas-tight, as it is the case with the embodiment according to FIG. 1 and also according to FIG. 5 which is still to be described.

Figure 2:
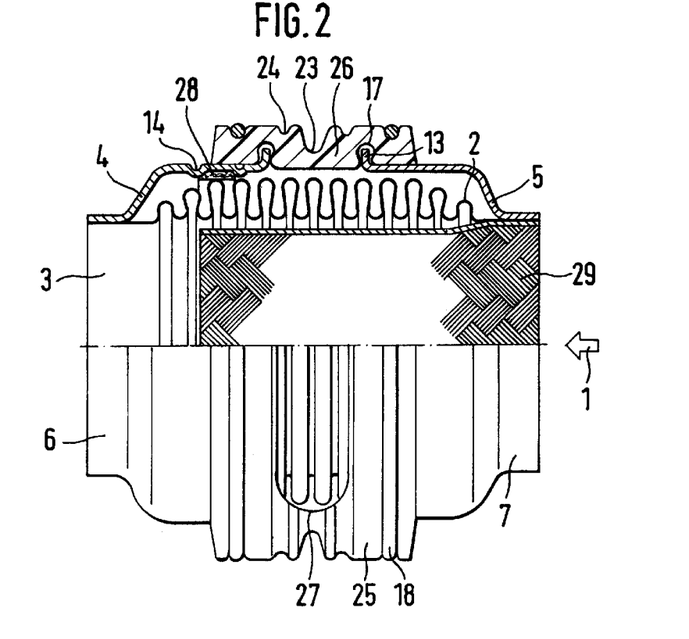
FIGS. 2 to 7 are views similar to FIG. 1 showing other embodiments of the invention.

The embodiment of the connecting element presented in FIG. 2 does, in its main features, correspond with the embodiment described in FIG. 1, with the following modifications:

The central section 26 of the intermediate part 25 shows perforations 27 which are distributed equally over its circumference. It is the aim of these perforations to ventilate the space between the supporting element 4, 5, intermediate part 25, and the tube element 2, thus avoiding a build-up of heat in this space.

Furthermore, the circumferential damping cushion 28 is, in this version, installed in one of the supporting parts 4, 5—in part 4 in the version presented—and is protected from axial displacement by a profile 14 also shown in FIG. 1. In this case, the tube element 2 is movable in relation to the damping cushion 28 under the occurrence of friction.

Finally, the braided hose 29 used as an internal sleeve is made, e.g., of a braiding, whose radial bulge is inserted in the upstream connection end 3 of the tube element 2.

Figure 3:
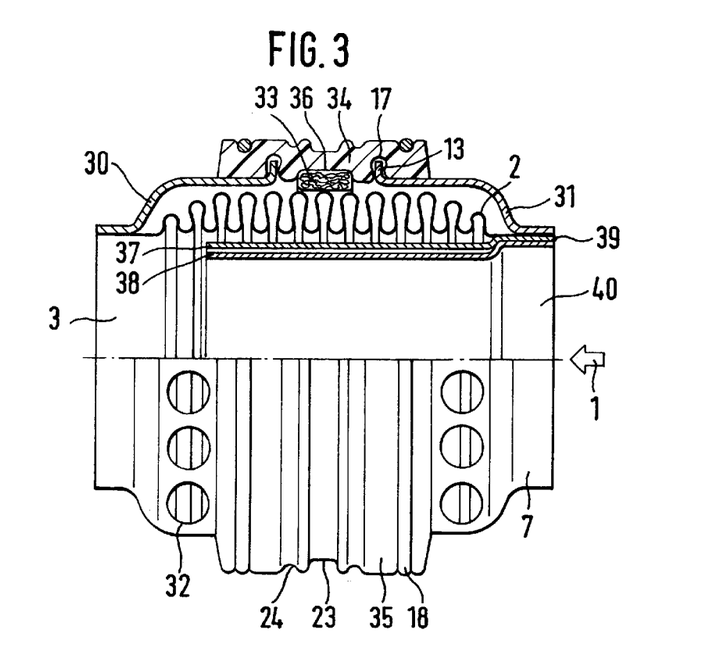

The part designed according to FIG. 3 is a modified version of the part designed according to FIG. 1, with its supporting parts 30, 31 showing perforations 32 which are distributed equally over its circumference. In this version, the perforations again have the task of ventilating the space outside the tube element 2 in the way already described in the passage dealing with FIG. 2.

Furthermore, the invention provides the installation of the wire cushion 33 in a support situated in the central section 34 of the intermediate part 35, with the support being a circumferential groove 36 of appropriate shape and dimensions.

Finally, two internal sleeves 37, 38 are provided, whose starting points are two end rings 39, 40 situated within the upstream connection end 3 of the tube element 2 and disposed at a radial distance to the corrugated section of the tube element 2 and to each other. This twin version of the internal sleeve allows an improvement of the thermal insulation of the tube element 2 from the heat of the gas.

Figure 4:
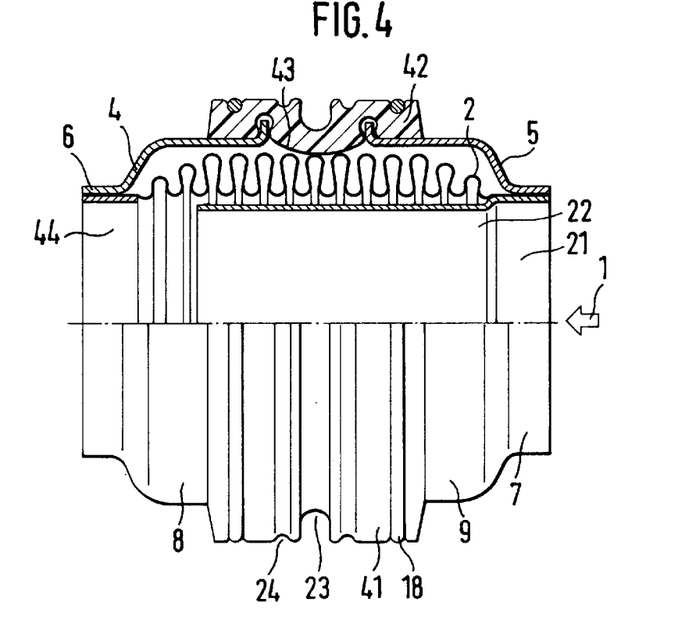

The embodiment according to FIG. 4 is a modified version of the embodiment of FIG. 1, with the central section 41 of the intermediate part 42 showing a bulge 43 on its interior surface. This bulge provides direct contact with the exterior surface of the tube element 2. Axial movements carried out by the external crests of the tube element 2 being an annularly corrugated metal hose will thus be reduced, which means a decrease in their frequency and amplitude. Furthermore, the embodiment presented in FIG. 4 also includes an end ring 44 in the downstream connection end 3 of the tube element 2, enabling the version presented in FIG. 4 of forming a blunt connection, e.g. a welded connection, with the continuing tube elements which are not included in the Figure.

Figure 5:
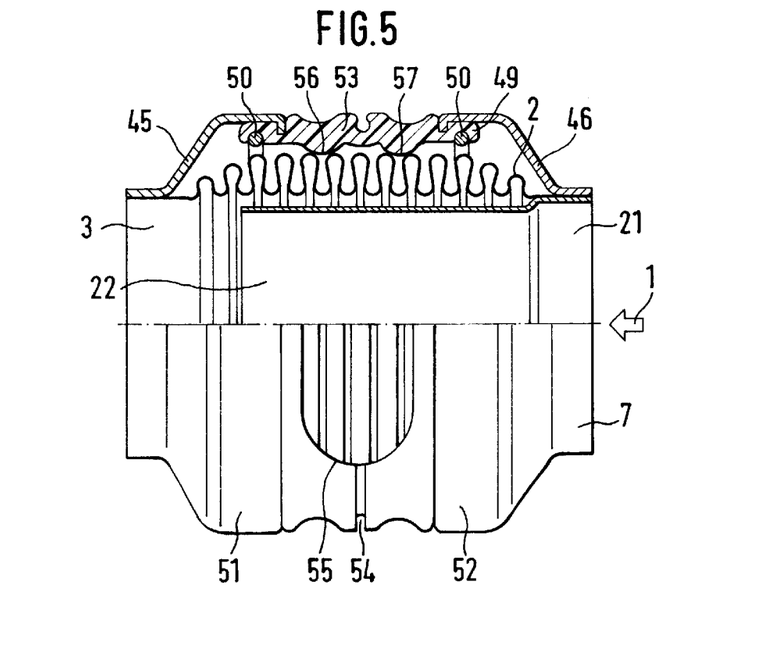

The embodiment designed according to FIG. 5 is another modified version, with bendings 47, 48 protruding in a radially inward direction from the ends of its supporting parts 45, 46 facing each other. Accordingly, the intermediate part 49 is not attached onto the supporting parts from outside but inserted from inside into the supporting parts 45, 46.

Accordingly, elastic spring rings 50 are inserted from inside into the sections of the intermediate part 49 running along the coats 51, 52 of the supporting parts 45, 46.

From the above description, it is clear that spring washers 18 (see FIG. 1) and elastic spring rings 50 (see FIG. 5) are tensioning means for pressing the intermediate part against the supporting parts.

The central section 53 of the intermediate part 49 is equipped with a circumferential cavity 54 of the type already described dealing with FIG. 1, and with perforations 55 of the type already described dealing with FIG. 2. Furthermore, it shows two bulges 56, 57 coming into contact with the exterior surface of the tube element 2 in a way already described dealing with FIG. 4.

Figure 6:
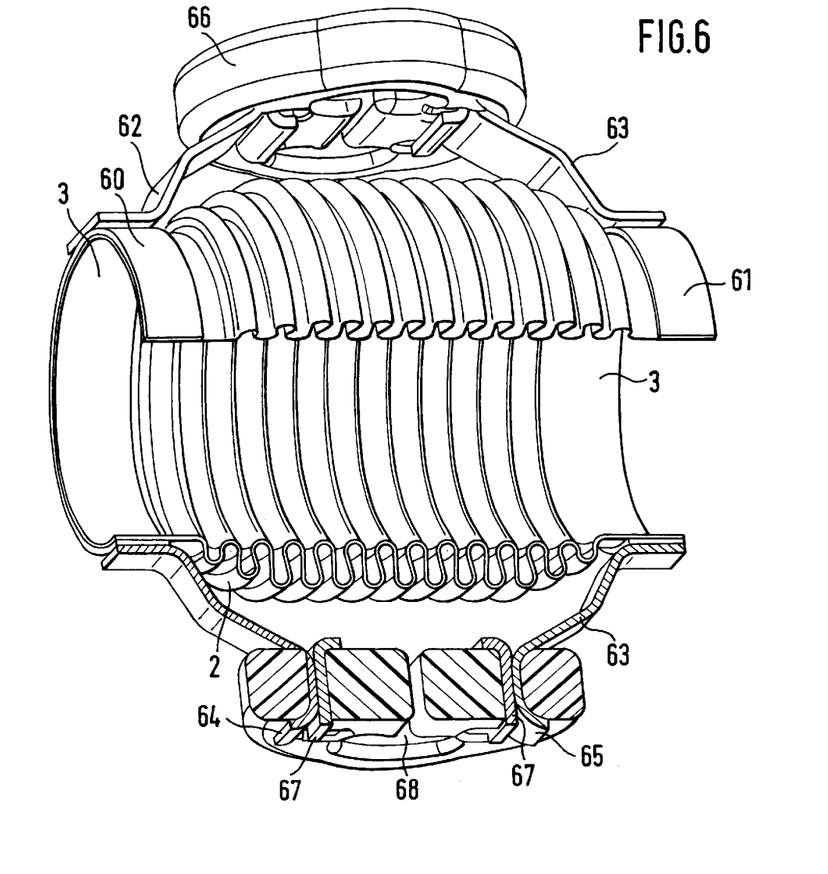

FIG. 6 shows another embodiment of a connecting element similar to the ones described above. This embodiment corresponds with the versions already described with respect to the tube element 2. In this version, however, the connection ends 3 of the tube element are equipped with end rings 60, 61. These end rings are connected with supporting parts 62, 63 which are brackets of bell-shaped cross-sectional area, e.g. by welding. The ends of these brackets facing each other, and the bendings 64, 65 in a radially outward direction, are connected with annular intermediate parts made of an elastomer, with the intermediate parts 66 being equipped by the attachment of reinforcing parts 67 made of metal. Furthermore, the configuration of these intermediate parts provides cavities 68 for the adjustment of the elastic properties. The drawing gives a detailed presentation of these cavities.

Figure 7:
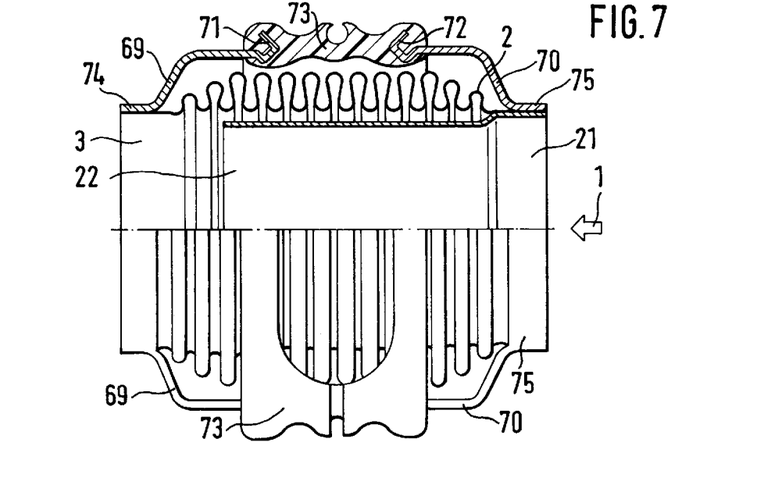

FIG. 7 shows a modified version of the part shown in FIG. 6, with the ends of the brackets 69, 70 facing each other being equipped with hooks 71, 72. An intermediate part 73 which surrounds the tube element 2 in a circumferential configuration already described in the foregoing text is sprayed onto these hooks, thus providing a particularly resistant connection between the brackets 69, 70 and the intermediate part 73. This connection process of spraying the intermediate parts onto the connection ends is principally possible with the embodiments described in the passages dealing with FIGS. 1 to 5.

Finally, FIG. 7 shows that the brackets 69, 70 can be connected with the end rings 74, 75 to form a single component element.

It will be understood that the above description of the present invention is susceptible to various modifications, changes and adaptations, and the same are intended to be comprehended within the meaning and range of equivalents of the appended claims.

What is claimed is:

1. A gas tight articulated connecting element for piping elements comprising:

a flexible gas tight tube element having a corrugated metal part and adapted to be securely connected with the piping elements;

a supporting element disposed at a distance from the tube element at an exterior region thereof and including a pair of supporting parts, each of the supporting parts being adapted to be connected at one end thereof to a piping element adjacent thereto, and at another end thereof to an adjacent other end of an adjacent one of said each of the supporting parts, wherein ends of the tube element are inserted radially into the supporting parts, and are further adapted to be attached onto the piping element; and flexible connection means disposed between adjacent ones of the supporting parts for connecting said another end to said an adjacent other end, the flexible connection means including an intermediate part made of an elastomer and being configured to be connected with the supporting parts in a locking connection, wherein the intermediate part comprises a ring generally defining a conical cavity therein, the ring further enclosing said another end of said each of the supporting parts, wherein each of the supporting parts comprises a bell shaped piping element and includes a conical neck at said one end thereof at least a portion of said bell shaped piping element extending over the corrugated metal part of the tube element, wherein said another end of said each of the supporting parts has a profiled configuration, wherein the intermediate part defines fitting cavities therein for establishing a positive locking connection with the profiling on said another end of said each of the supporting parts, wherein each of the supporting parts comprises a supporting sleeve, wherein the intermediate part includes a section disposed along sleeves of the supporting parts and in direct contact therewith, and wherein the connecting element further comprises tensioning means for pressing the section of the intermediate part against the sleeves of the supporting parts, the tensioning means being one of inserted into and attached to the section.

2. A gas tight articulated connecting element for piping elements comprising:

a flexible gas tight tube element having a corrugated metal part and adapted to be connected with the piping elements;

a supporting element disposed at a distance from the tube element at an exterior region thereof and including a pair of supporting parts, each of the supporting parts being adapted to be connected at one end thereof to a piping element adjacent thereto, and at another end thereof to an adjacent other end of an adjacent one of said each of the supporting parts, wherein ends of the tube element are inserted radially into the supporting parts, and are further adapted to be attached onto the piping element; and flexible connection means disposed between adjacent ones of the supporting parts for connecting said another end to said an adjacent other end, the flexible connection means including an intermediate part made of an elastomer and being adapted to be connected with the supporting parts in a locking connection for forming the connecting element, wherein the intermediate part comprises a ring generally defining a conical cavity therein, the ring further enclosing said another end of said each of the supporting parts, wherein each of the supporting parts comprises a bell shaped piping element and includes a conical neck at said one end thereof, at least a portion of said bell shaped piping element extending over corrugated part of the tube element, wherein said another end of said each of the supporting parts has a profiled configuration, wherein the intermediate part defines fitting cavities therein for establishing a positive locking connection with the profiling on said another end of said each of the supporting parts, and wherein each of the supporting parts comprises a supporting sleeve, wherein the intermediate part includes a section disposed along sleeves of the supporting parts and in direct contact therewith, and wherein the connecting element further comprises tensioning means for pressing the section of the intermediate part against the sleeves of the supporting parts, the tensioning means being one of inserted into and attached to the section, and the supporting parts and the intermediate element being substantially gas tight and further being configured such that an assembly formed therefrom is securely connectable with the piping elements.

3. The connecting element according to claim 1, wherein the profiled configuration comprises a bend which has one of a radial orientation and a hook-shaped longitudinal cross sectional area.

4. The connecting element according to claim 1, wherein the tensioning means comprise one of spring washers, closed washers and tension strips.

5. The connecting element according to claim 1, wherein the intermediate part has a central section disposed between said another end of the supporting parts, the central section defining a cavity therein which covers an entire circumference of the tube element.

6. The connecting element according to claim 5, further comprising a damping cushion disposed directly between the central section and the tube element, the damping cushion extending about an entire circumference of the tube element.

7. The connecting element according to claim 1, further comprising a damping cushion extending about an entire circumference of the tube element and inserted between at least one of the supporting parts and the tube element for filling a space between the at least one of the supporting parts and the tube element.

8. The connecting element according to claim 7, wherein:

the at least one of the supporting parts defines a groove therein; and the damping cushion is inserted in the groove and is configured to form a positive locking connection therewith.

9. The connecting element according to claim 6, wherein the damping cushion comprises one of a sheet and a mesh, and is made of one of metal and ceramic and glass fibers.

10. The connecting element according to claim 1, wherein said one end of at least one of the supporting parts includes at least one end ring inserted into a corresponding end of the tube element.

11. The connecting element according to claim 10, wherein the connecting element further comprises an internal sleeve inserted into the tube element and covering a substantial portion of a length thereof, the internal sleeve further defining the end ring of said at least one of the supporting parts and being located at a radial distance from the tube element.

12. The connecting element according to claim 1, further comprising one of a braided hose and a hose having an interlocked profile, the hose being inserted into one end of the tube element and covering a substantial portion of a length thereof, the hose further being located at a radial distance with respect to the tube element.

* * * * *

UNITED STATES PATENT AND TRADEMARK OFFICE
CERTIFICATE OF CORRECTION

PATENT NO. : 6,296,282 B1
DATED : October 2, 2001
INVENTOR(S) : Carlo Burkhardt et al.

Page 1 of 1

It is certified that error appears in the above-identified patent and that said Letters Patent is hereby corrected as shown below:

Column 3,
Line 42, "conical" should read -- cylindrical --.

Column 9, claim 1,
Line 6, "conical" should read -- cylindrical --.

Column 9, claim 2,
Line 48, "conical" should read -- cylindrical --.

Signed and Sealed this

Sixteenth Day of April, 2002

Attest:

JAMES E. ROGAN
*Attesting Officer*          *Director of the United States Patent and Trademark Office*